L. A. CORNELIUS.
VALVE SEATING TOOL.
APPLICATION FILED MAR. 13, 1911.

1,007,068.

Patented Oct. 31, 1911.

Witnesses
Harold O. Van Antwerp
Mac Pauskin

Inventor
Louis A. Cornelius
By Luther V. Moulton
Attorney

UNITED STATES PATENT OFFICE.

LOUIS A. CORNELIUS, OF GRAND RAPIDS, MICHIGAN.

VALVE-SEATING TOOL.

1,007,068.   Specification of Letters Patent.   Patented Oct. 31, 1911.

Application filed March 13, 1911. Serial No. 614,152.

*To all whom it may concern:*

Be it known that I, LOUIS A. CORNELIUS, a citizen of the United States of America, residing at Grand Rapids, in the county of Kent and State of Michigan, have invented certain new and useful Improvements in Valve-Seating Tools; and I do hereby declare the following to be a full, clear, and exact description of the invention, such as will enable others skilled in the art to which it appertains to make and use the same.

My invention relates to improvements in valve seating tools, and more particularly to manually operated tools for the purpose, and its object is to provide the same with means whereby it is adapted to dress the valve seats of a variety of valves, bibs, cocks, etc., and it consists essentially of a suitable stem having a hand wheel at one end to manually rotate the same, and provided with detachable cutters at the other end for dressing the valve seats, and truncated conical guide members provided with internal and external screw threads whereby the same are adapted to engage either externally or internally threaded valves of various kinds and sizes and center the stem accurately in the axis thereof, as will more fully appear by reference to the accompanying drawings, in which:—

Figure 1:
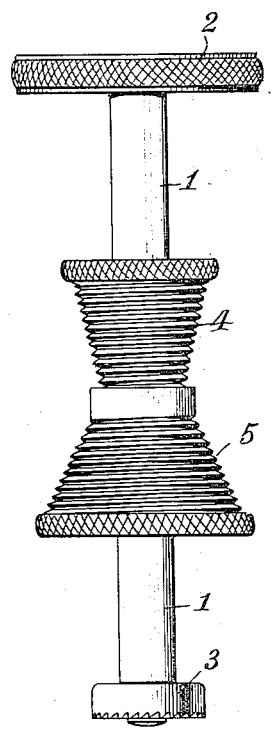
Figure 2:
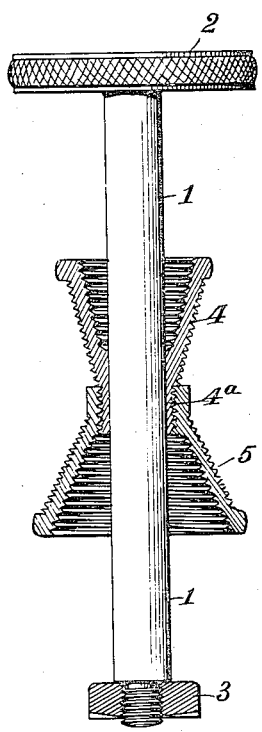
Figure 3:
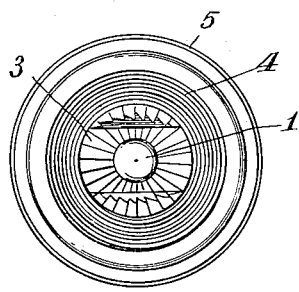
Figure 4:
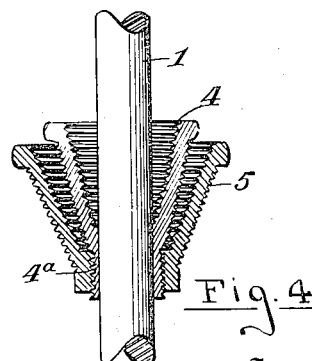

Figure 1 is a side elevation of a device embodying my invention; Fig. 2 the same partially in vertical section; Fig. 3 an inverted plan view assembled as shown in Fig. 1; and Fig. 4 a sectional detail with the cones assembled as in Fig. 7.

Like numbers refer to like parts in all of the figures.

1 represents a suitable stem or shaft, on the upper end of which is a wheel 2 to manually rotate the same and on the lower end is a seat dressing tool 3 adapted to dress the valve seat of a valve, cock, or other like device.

4 is a small truncated conical guide member having both internal and external threads adapted to engage the threads of either internally or externally threaded valves, bibs, cocks and like devices. The small end of this cone fits closely around the stem 1 in which the same is rotative and serves to accurately center the stem in the axis of the threaded portion of the valve to which it is applied. This small end is also prolonged in tubular form as at 4ᵃ and externally threaded to fit within a like prolongation to the small end of a larger cone 5 whereby the cones may be assembled with the large ends of the cones oppositely extended or with the small cone within the larger cone. This larger cone 5 is also both externally and internally threaded to engage the threads of the valves to which the device may be applied.

By virtue of the described construction it will be noted that the two cones collectively are provided with external threads ranging from the size of the small end of the small cone to the large end of the larger cone thus adapting them to engage internally threaded valves of a great variety of sizes, and that they are also provided with internal threads ranging from the small end of the small cone to the large end of the large cone and adapted to engage externally threaded valves and that by assembling the cones in one or the other of the two positions or using the smaller cone separately the entire range of these threads both internal and external is made available and the stem 1 accurately centered by means of these cones in a great variety of valves either internally or externally threaded.

What I claim is:—

A valve seating tool, comprising a shaft having a cutter attached, means for rotating the shaft, an internally and externally screw threaded truncated cone having a tubular portion closely engaging the shaft to guide the same and externally threaded, and a larger internally and externally threaded truncated cone having its small end internally threaded to reversibly receive the extension on the small cone.

In testimony whereof I affix my signature in presence of two witnesses.

LOUIS A. CORNELIUS.

Witnesses:
 PALMER A. JONES,
 MAE RANKIN.